United States Patent Office 2,974,936
Patented Mar. 14, 1961

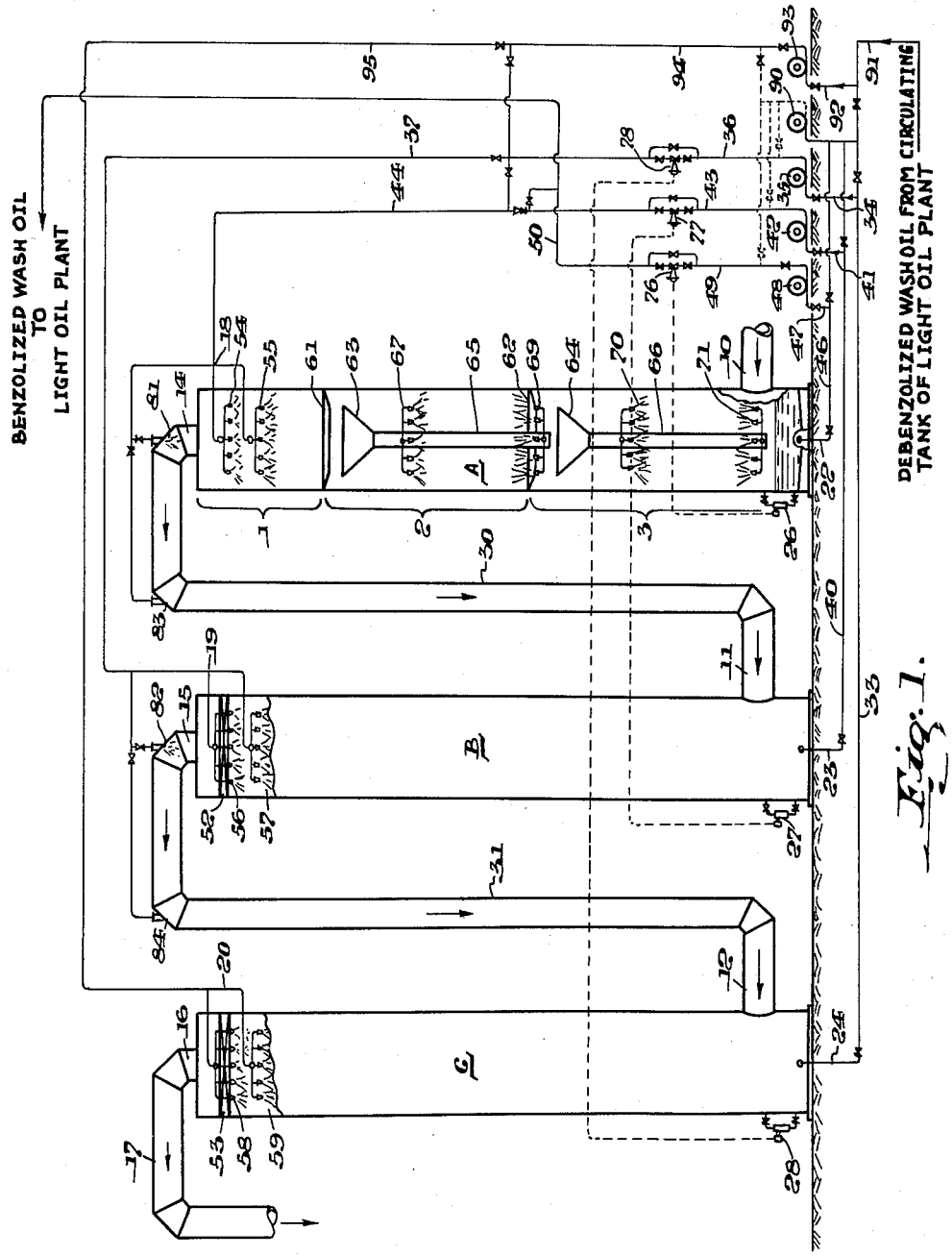

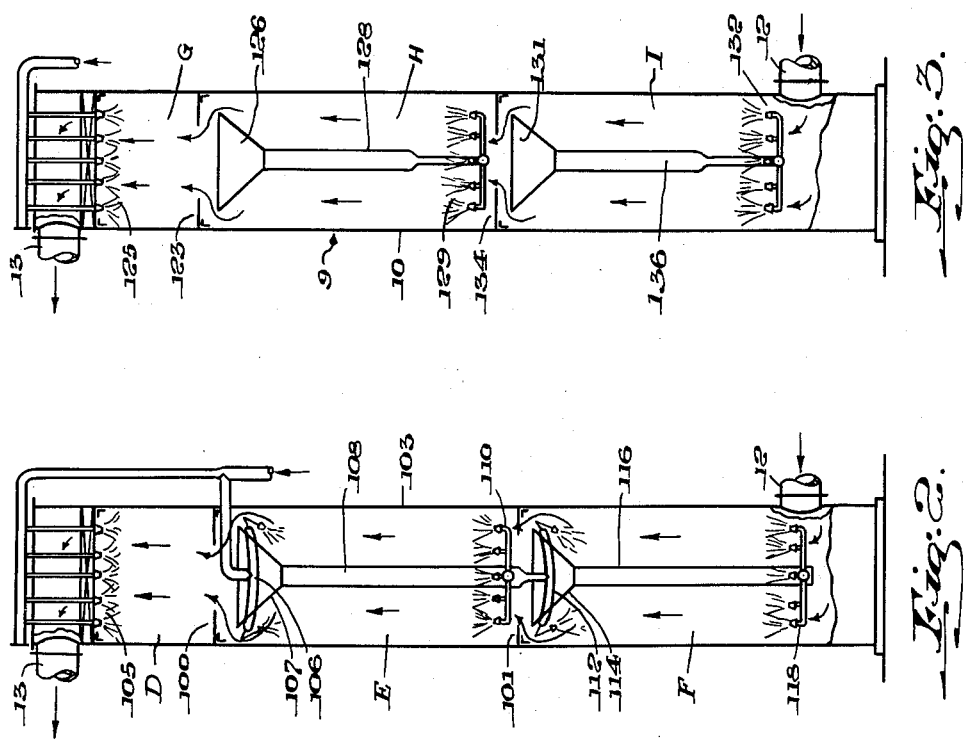

2,974,936
ABSORPTION APPARATUS

Joseph van Ackeren and Edward J. Helm, Pittsburgh, Pa., assignors to Koppers Company, Inc., a corporation of Delaware Filed May 22, 1957, Ser. No. 660,791
2 Claims. (Cl. 261—115)

This invention relates generally to the separation of light oil vapors from coke oven gas.

The light oil components of the gases which are formed during the industrial coking of coal are generally removed by scrubbing the gases in a tall tower with an absorbent liquid that is usually a petroleum distillate having a high boiling point. Conventionally the absorbent liquid or wash oil is passed downwardly through the tower as the gas is passed upwardly. To provide intimate contact of the gas and wash oil, the wash oil may be sprayed into the upper portion of a tower; and, in order to minimize the quantity of wash oil required to remove the light oil, the wash oil may be collected at various points throughout the height of the tower and sprayed again. Sufficient contact of the gas and wash oil is thus obtained so that the gas leaving the top of the tower is substantially free of light oil and the wash oil leaving the bottom of the tower is more or less saturated with the light oil at the partial pressure of the light oil in the gas which enters the tower.

The foregoing arrangement has presented a problem, however, in the provision of pressure for forcing the wash oil through the additional sprays. To provide this pressure mechanically has required considerable piping, pumps and control apparatus; and such equipment has increased both the initial cost of the installation and the later cost of operation and maintenance.

Previous efforts to provide this pressure by the force of gravity for forcing the oil through the additional sprays, have not been satisfactory because 60–80 percent of the tower height has been consumed by the space which is required for the collection and storage of the liquid to produce the necessary spray pressures and spray distribution for the spray stages located below each liquid collection zone. Therefore, to accomplish the same absorption capacity, installations using gravity as heretofore known have required much higher towers than installations using pumps; and as a result, the cost of gravity type installations has approached or exceeded the cost of pump type installations.

An object of the present invention, therefore, is to provide a novel apparatus for absorbing the light oil from coke oven gas by repeatedly spraying the gas with an absorbing oil without the use of auxiliary pumps between the various spray sections.

Another object is to provide a novel apparatus for removing the light oil from coke oven gas in a scrubbing tower wherein use is made of the force of gravity for spraying the absorbent oil through successive spray units after the initial introduction of the oil into the tower and wherein effective use is made of substantially all of the tower height.

Another object is to provide a novel apparatus for separating light oil from coke oven gas wherein the apparatus is of simple construction so as to reduce the cost of operation and maintenance of the apparatus.

The present invention contemplates a novel apparatus for absorbing light oil from coke oven gas in an absorbent oil by contacting the gas with the absorbent oil as the gas ascends the tower and the absorbent oil descends after being initially sprayed into the upper portion of a tower as a mist or droplets to contact gas passing upwardly through the tower; the liquid thereafter being cooled and sprayed again in lower portion of the tower and the gravity head provided by the collected droplets being sufficient to avoid the use of pumps as a pressure source in the subsequent sprays.

In accordance with the present invention, the height of a column of the absorbent oil provides the head for the liquid. At the lower end of this column, the oil is sprayed upwardly concurrent with the flow of gas and at an intermediate point of the column, in the preferred embodiment, the oil is also sprayed downwardly or countercurrent to the flow of gas. Spraying the absorbent oil upwardly at the lower portion of the column utilizes a substantial part of the tower height that is required to develop the hydrostatic pressure on the sprays for also contacting spray and gas. We have also found that a pressure, for example, of 10 pounds per square inch gauge at the spray nozzles, gives a great increase in absorption efficiency over that obtained with a lower pressure, such as 3 pounds per square inch gauge. However, 10 p.s.i.g. requires a head or column of about 26 feet of oil as against a head of about 8 feet for 3 p.s.i.g. By turning the sprays upward near the bottom of a spray chamber of conventional height in accordance with the present invention, a head of 10 p.s.i.g. can be obtained on the lower sprays without adding to the height of the spray chamber. Further, by placing the sprays near the top of the spray chamber at a height to provide 3 p.s.i.g. in addition to sprays at the bottom at a height to provide 10 p.s.i.g., optimum coverage of the top portion of the spray chamber is obtained with a minor portion of the oil circulation and of the bottom portion of the spray chamber with a major portion of the oil circulation of finer droplet size and more uniform dispersion. By actual test, this combined arrangement, shows an absorption efficiency for benzol, when expressed in Transfer Units per spray section, equal to 133 percent of the efficiency, expressed in the same units obtained by spraying all the oil circulation through sprays near the top of the spray chamber at 3 p.s.i.g. as practiced heretofore in gravity type spray scrubbers. Of course, increased efficiency could be obtained with scrubbers having sprays only near the top of each spray section by providing sufficient head to obtain 10 p.s.i.g. or more on these sprays, but this would add greatly to the height of these scrubbers. Thus, the present invention provides a means of obtaining this improved efficiency without increasing the height of the scrubbers.

The above and further objects and novel features of the invention will appear more fully from the following detailed description when the same is read in connection with the accompanying drawings. It is to be expressly understood, however, that the drawings are not intended as a definition of the invention but are for purposes of illustration only.

In the drawings wherein like parts are marked alike:

Figure 1 illustrates schematically a complete system according to the present invention for absorbing the light oil components from coke oven gas;

Figure 2 illustrates schematically another embodiment of the towers shown in Figure 1; and Figure 3 illustrates schematically another embodiment of the towers.

Turning now to Figure 1 of the drawings, a complete system for the removal of light oil vapors from coke oven gas is illustrated schematically as generally comprised of three substantially similar, vertical elongated towers A, B and C. These towers are connected for the countercurrent series flow of gas and absorbent oil therethrough. Each tower, A, B, and C has a gas inlet 10, 11, 12; a gas outlet 14, 15, 16; a liquid input 18, 19, 20; a liquid output 22, 23, 24; and a liquid lever control 26, 27, 28. The gas containing light oil vapors enters the system at inlet 10 of tower A and leaves at outlet 16 of tower C and through exhaust duct 17 substantially free of light oil vapors after passing from gas outlet 14 of tower A by way of duct 30 to gas inlet 11 of tower B and from gas outlet 15 of tower B by way of duct 31 to gas inlet 12 of tower C. After leaving at the outlet 16 of tower C, the gas may be sent to the coke ovens or other point of consumption, or to other apparatus for further processing the gas to remove other constituents. On the other hand, fresh or debenzolized absorbent oil substantially free of light oil enters tower C at inlet 20 and leaves tower A at liquid outlet 22 as benzolized wash oil more or less saturated with light oil at the pressure and temperature of the gas entering tower A at inlet 10.

The path of this absorbent oil through the system is as follows: the absorbent oil enters tower C at inlet 20, leaves tower C at outlet 24 and by way of lines 33 and 34, pump 35, and lines 36 and 37 enters tower B at inlet 19; leaves tower B at outlet 23 and by way of lines 40 and 41, pump 42, and lines 43 and 44 enters tower A at inlet 18; leaves outlet 22 of tower A and by way of lines 46 and 47, pump 48, and lines 49 and 50 is conducted to a conventional light oil plant.

Towers A, B, and C are similar so that, for purposes of simplicity in description, tower A has been illustrated in sectional view. Those portions of towers B and C which differ from tower A have been illustrated by broken-out sections, the latter portions being the provision of mist eliminators 52 and 53, in towers B and C respectively.

As shown herein, the liquid input 18, 19, 20 of each tower is connected to a pair of sprays 54—55, 56—57, 58—59, positioned in spaced vertical relationship in the upper portion of the tower. Below these sprays and suitably secured to the walls of the tower (shown in detail in tower A) are a pair of rings 61 and 62 which divide the tower into three chambers. These rings are of generally inverted frustoconical shapes whose center openings are below the elevation at which the rings are attached to the shell of the tower.

Suitably mounted in spaced arrangement below each ring 61, 62 is a cup 63, 64 of general frustoconical shape with a maximum diameter slightly greater than the inside diameter of its adjacent ring 61, 62 at the lowest elevation of the ring. Each cup 63, 64 terminates in a stem or downcomer 65, 66. Attached to downcomer 65 is a pair of spray units 67 and 69, and attached to downcomer 66 is a pair of spray units 70 and 71. The nozzles of spray units 67 and 70 point downwardly to spray the liquid countercurrent to the direction of travel of the stream of gas and the nozzles of spray units 69 and 71 point upwardly to spray the liquid concurrent to the direction of flow of the gas. Spray units 67 and 70 are spaced a distance below cups 63 and 64 to provide sufficient pressure to force liquid through the nozzles of the spray units, and spray units 69 and 71 are spaced near the bottom of their respective downcomers. Additionally, spray unit 69 is so positioned relative to ring 62 that the spray from unit 69 barely clears ring 62, and spray unit 71 is positioned slightly above the gas inlet 10.

As shown in detail in tower A, controllers 26, 27, 28 maintain the level of liquid at the bottom of their respective towers below inlets 10, 11, 12. To this end, level control 26 actuates a valve 76 on the line 49 conducting the liquid from the tower, and control 27 actuates valve 79, and control 28 actuates valve 78.

As the gas leaves towers A and B through conduits 30 and 31, the gas may be subjected to further contact with absorbent oil from first spray nozzles 81, 82 which spray oil countercurrent to the direction of travel of the gas and from second spray nozzles 83, 84 which spray oil concurrently to the direction of flow of the gas. The oil from spray 81 is collected in tower A, the oil from spray 82 is collected in tower B, the oil from spray 83 is drained to the bottom of tower B, and the oil from spray 84 is drained to the bottom of tower C. Exhaust duct 17 contains no sprays.

Mist eliminators 52 and 53 may be of a conventional type to prevent the carry-over of absorbent oil with the gas. The mist eliminators are provided for both towers B and C so that any one of the three towers may be taken out of service for repair without upsetting the operation of the other two. To this end, a spare pump 90 is advantageously provided as well as the conduits and valves (not numbered) and gas bypass connections for conduits 10, 17, 30 and 31 (not shown).

The fresh or debenzolized wash oil substantially free of light oil is fed from a circulating tank of the light oil plant (not shown) to the oil inlet 20 of tower C by way of lines 91 and 92, pump 93 and lines 94 and 95. The wash oil enters tower C at sprays 58 and 59 and passes generally downwardly through tower C into contact with the gas passing upwardly through this tower. The wash oil leaves tower C at outlet 24 and enters tower B at inlet 19. From sprays 56 and 57, the wash oil passes generally downwardly through tower B in countercurrent flow to the gas passing upwardly through the tower. The wash oil leaves tower B at outlet 23 and enters tower A at inlet 18.

Since towers A, B and C are generally alike, the detailed description of the action of the oil and gas in tower A will be given, it being understood that similar action takes place in towers B and C. Considering tower A, the oil sprayed into the chamber 1 of tower A through the upper sprays 54 and 55 as a mist or droplets falls downwardly through the tower countercurrent to the gas flowing upwardly. Any droplets which strike the wall of the tower flow down the wall as a film of liquid until they reach guide member 61 whereupon they are flowed inwardly toward the center of the tower. This liquid and the rest of the spray from spray units 54 and 55 falls into cup 63 and fills downcomer 65 to the height of cup 63. The column of liquid thus formed provides a head for forcing the liquid through the spray units 67 and 69 in chamber 2. As explained before, a lesser head of force is applied to spray unit 67 than to spray unit 69. The quantity of liquid discharged from each unit is proportional to the head applied thereto so that liquid received at cup 63 is sprayed downwardly countercurrent to the flow of gas by spray unit 67 and a major portion of the liquid is sprayed upwardly concurrent to the flow of gas by spray unit 69. In this manner, the chamber 2 is covered with an optimum quantity of spray droplets in intimate contact with the ascending gas. These droplets from spray units 67 and 69 fall downwardly or contact the walls of the tower and flow downwardly and are guided by ring 62 into cup 64. Cup 64 and downcomer 66 provide a head so that the oil is sprayed again in chamber 3 by spray units 70 and 71 as in chamber 2. The foregoing process occurs in each of the towers A, B and C.

The incoming gas containing light oil vapors enters at inlet 10 of tower A and passes upwardly to outlet 14; and the wash oil after passing through towers B and C enters tower A at inlet 18 and leaves at outlet 22. Thus, the gas having the greatest concentration of light oil is in contact with the liquid having the greatest concentration of light oil absorbed therein with the result that the oil leaving at outlet 22 is substantially in equilibrium with the light oil in the gas at the temperature and pressure of the entering gas. The light oil is extracted from the gas as the gas goes through towers A, B and C so that the gas leaving tower C is substantially free of light oil. The gas leaving tower C is contacted with absorbent oil which is substantially free of light oil so that the light oil content of the gas is kept at a minimum. Thus, the present invention provides for the generally countercurrent flow of gas and absorbent oil; the gas flowing through towers A, B and C in series and the wash oil flowing countercurrently through towers C, B and A.

Figure 2 shows another embodiment of the spray towers of the present invention which may be substituted for the towers of Figure 1. In Figure 2, a pair of rings 100 and 101 divide tower 103 into three chambers D, E, F. Fresh oil is sprayed into tower 103 initially into chamber D at spray unit 105 and into chamber E at spray unit 106. This spray unit sprays the wash oil downwardly countercurrent to the flow of gas in the tower. The spray droplets from spray unit 105 are guided by ring 100 to a cup 107 having a downcomer 108 terminating in a pair of spray units 110 and 112. Spray units 110 spray the liquid upwardly concurrent to the direction of flow of the gas and spray units 106 spray the liquid downwardly countercurrent to the flow of gas. Thus, spray units 106 and 110 spray the liquid in opposition in chamber E. The droplets from sprays 106 and 110 are guided by ring 101 to a second cup 114 which has a downcomer 116 providing a pressure head on spray unit 118 that is near the level of the gas inlet 12 in chamber F, and sprays upwardly concurrent to the flow of gas.

In the embodiment shown in Figure 2, spray units 106 and 112 do not depend upon the pressure head developed in the chamber in which the liquid is sprayed. Accordingly, these spray units may be placed as near as practicable to the separation and guiding members 100 and 101, so as to utilize the maximum amount of the tower height for the spray absorption. Furthermore, the gas ascending the tower is contacted with spray droplets of different concentrations in each chamber E and F so that the gas which is at the bottom of the chamber and which has the greater concentration of light oil therein is contacted with wash oil having the greater concentration of light oil therein while the gas which is at the top of the chamber and which has less concentration of light oil therein is contacted with wash oil having less concentration of light oil therein. This embodiment, therefore, is capable of utilizing the tower height to maximum extent for gas and oil contact and is also capable of providing a wash oil concentration gradient which tends to follow the concentration gradient of the gas.

Figure 3 shows a further embodiment of the tower of the present invention wherein a pair of rings 123 and 134 are spaced at suitable distances along the height of the tower to divide the tower into three chambers G, H, I. An absorbent liquid is initially sprayed into the tower at spray unit 125 at chamber G and guided by ring 123 to a cup 126 having a downcomer or stem 128 which terminates in spray units 129 in chamber H. Spray units 129 spray the droplets upwardly in the direction of flow of the gas. By suitably adjusting the sprays, the droplets may be sprayed approximately the height of cup 126 before dropping downwardly again, the upward flow of the gas substantially compensating for the loss of head due to the frictional effects in stem 126 or at nozzles 129. A similar cup 131 in chamber I catches these droplets and by way of downcomer 136 provides a head for spraying the liquid upwardly again from sprays 132.

The foregoing has presented several novel arrangements for removing light oil vapors from coke oven gas by contacting a stream of gas with an absorbent oil in a general countercurrent fashion. The oil is initially sprayed under pressure as droplets from an upper spray unit of the tower; thereafter the droplets are collected and sprayed again in a lower section of the tower through the force of gravity and by way of a series of spray units disposed throughout the height of the tower. The head from the collecting device, in accordance with the present invention, is sufficient to avoid the use of pumps for subsequent sprays and still permit a tower of practical height to be constructed by reason of using portions of the height of the tower both to provide the necessary head for spraying the oil and also for contacting oil spray with the gas by means of pointing sprays upward near the bottom of the spray chambers.

Although several embodiments of the invention have been disclosed for purposes of illustration it is evident to those skilled in the art that the invention is not limited thereto but that various changes and modifications may be made therein without departing from the scope and spirit of the invention.

What is claimed:

1. Apparatus for absorbing the light oil vapors of coke oven gas into an absorbent oil, comprising a tower, means for flowing gas upwardly through said tower, an uppermost spray unit constructed and arranged to spray absorbent oil downwardly in the tower, means for initially introducing said absorbent oil into said tower at said uppermost spray unit, further spray units positioned along the height of said tower and arranged as pairs of spray units spaced apart longitudinally of said tower for spraying liquid in opposed directions upwardly and downwardly, directing means, positioned under said uppermost unit and intermediate said pairs of spray units, operative by gravity and constructed and arranged to direct absorbent oil downwardly within the tower to the immediate sub-adjacent spray unit, said spray units being constructed and arranged to receive absorbent oil only from above-positioned directing means, said directing means including catch means, ring shaped means spaced above said catch means for guiding the film of liquid which flows from the walls of the tower to said catch means and its associated pair of spray units so as to provide a gravity pressure which is the sole means of causing said liquid to spray from the last-mentioned pair of spray units.

2. Apparatus according to claim 1 wherein said ring shaped means is of a general frusto-conical shape with a central opening below the height at which the ring shaped means is secured to the tower, and said catch means is a cup having a diameter slightly larger than the central opening of said ring shaped means and being disposed beneath said ring shaped means for catching the droplets from the spray above said cup and the liquid flowing from said ring shaped means.

References Cited in the file of this patent

UNITED STATES PATENTS

| 1,928,904 | Mart | Oct. 3, 1933 |
| 2,675,215 | Otto | Apr. 13, 1954 |
| 2,677,433 | Kretzschmar | May 4, 1954 |
| 2,733,961 | Rhinehart et al. | Feb. 7, 1956 |
| 2,753,949 | Manuel | July 10, 1956 |

FOREIGN PATENTS

| 226,271 | Great Britain | Dec. 17, 1924 |